United States Patent Office
3,024,515
Patented Mar. 13, 1962

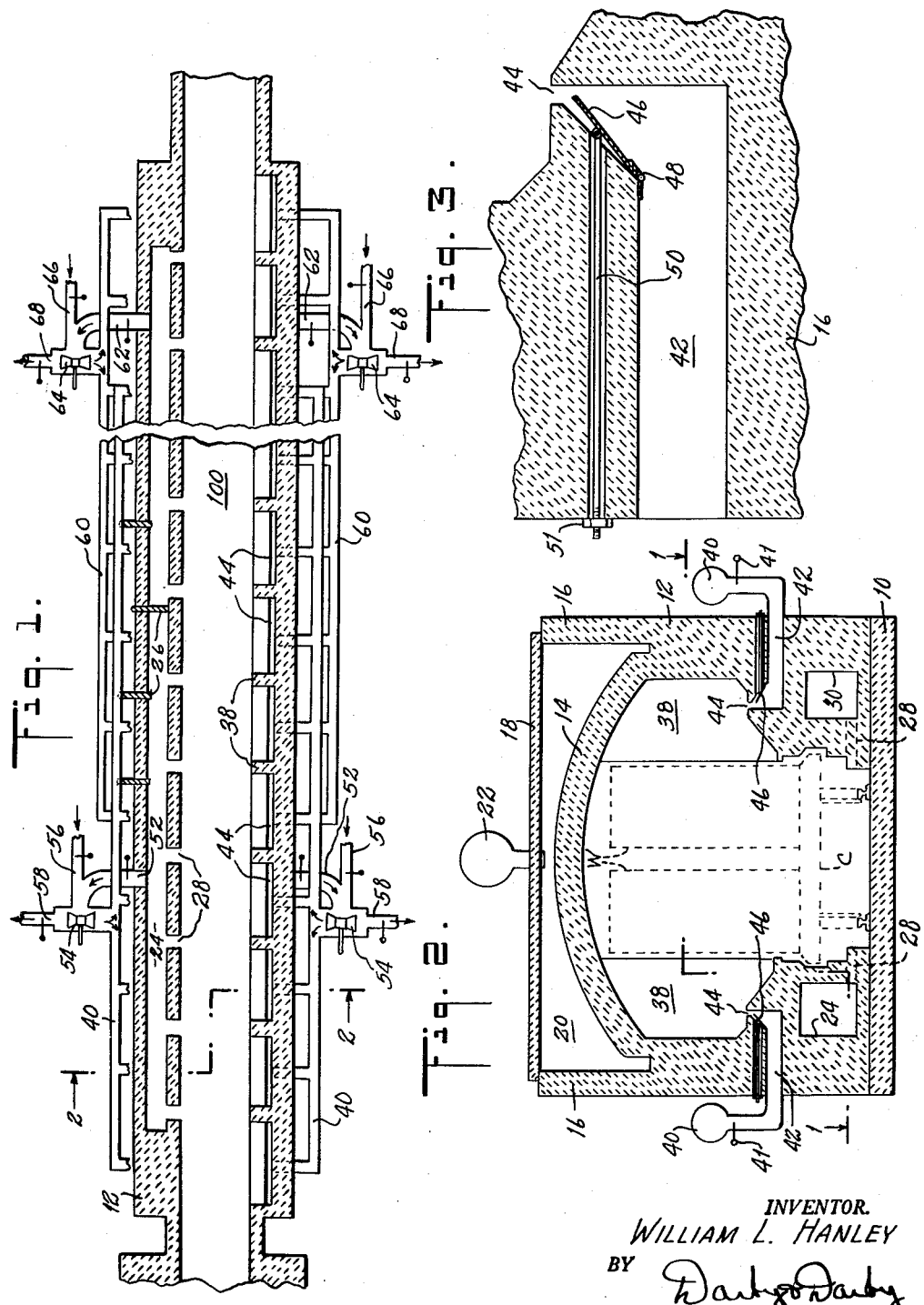

3,024,515
COOLING SECTION FOR TUNNEL KILN
William Lee Hanley, Greenwich, Conn.
(101 Park Ave., New York, N.Y.)
Filed Apr. 14, 1959, Ser. No. 806,379
7 Claims. (Cl. 25—142)

This invention relates to the cooling section of a tunnel kiln.

An important object of the invention is to provide an improvement in such structure by means of which the circulation and recirculation of the cooling air within the cooling section of the kiln can be sectionally and quantitatively controlled to abstract heat therefrom in accordance with precise cooling schedules.

Another object of the invention is to provide in a structure of this type, means for causing a jetted distribution of the cooling air into the tunnel and about the ware being cooled, at different velocities and quantities at special points along the tunnel to effect cooling schedules most beneficial to the final product.

A more specific object of the invention is to provide a plurality of controlled cooling air supply jets for kilns of this type.

Still more specifically an object of this invention is to provide individually controlled air recirculation paths by means of variable jet inlet orifices in the cooling section to independently control the temperature and quantitative distribution of air sectionally through the tunnel and about the ware.

Other and more detailed objects of the invention will be apparent from the following description of the embodiment thereof illustrated in the accompanying drawings.

In the drawings,

FIGURE 1 is a cross-sectional view taken on the line 1—1 of FIG. 2, through the cooling section of a tunnel kiln with some parts broken away to adapt the figure to the dimensions of the drawing sheet;

FIGURE 2 is a typical cross-sectional view taken on the line 2—2 of FIG. 1; and

FIGURE 3 is an enlarged cross-sectional view showing in more detail the damper construction and its control.

This art fully understands the general construction and operation of tunnel kilns through which ceramic ware to be processed is moved to first heat the ware up to curing and firing temperatures and finally to cool it progressively to safe temperatures by the time it issues from the kiln. One of the problems in the operation of the cooling section of a tunnel kiln is the efficient control of the cooling air in different points along the length of the cooling section, so that varied cooling schedules can be practiced depending upon the characteristics of the ware being processed. There are many factors which are involved in the efficient operation of the cooling section, one of which is the efficient distribution of the air in the cooling section at different points to effect precise cooling schedules. This invention is concerned with a system by means of which such precise control may be effected, having in mind the attainment of high heat transfer efficiency at safe rates of cooling.

Referring now to the accompanying drawings, sufficient of the cooling section which forms a continuation of the preheating and firing sections of the tunnel kiln is illustrated somewhat diagrammatically in order to understand the nature of the novel system herein disclosed. The cooling section consists of an elongated refractory housing 12 supported upon a suitable foundation 10. The exact form of the housing and the materials of which it is constructed are not important to this invention and can be varied widely. As illustrated, the housing includes a refractory roof 14 of arcuate section, which is enclosed within a space 20 by upwardly extending extensions 16 of the side walls and closed by a cover 18. As is well known in the art, air can be circulated through the space 20 and the conduit 22, extending along the top of the tunnel, for efficient control of the operation. However, this feature is not important to the novel subject matter herein disclosed.

The ware to be processed, diagrammatically indicated by the reference character W, is supported upon cars C which move through the tunnel formed by the housing 12 on rails, all as is well understood in the art.

The base of the tunnel is formed to provide two longitudinally extending channels 24 and 30, which extend throughout the length of the cooling section, as indicated for the channel 24 in FIG. 1, to provide exhaust ducts for the main tunnel 100. At spaced points longitudinally of the cooling section are exhaust passages 28 which connect the main tunnel 100 with the ducts 24 and 30 near the bottom thereof. As illustrated in FIG. 1, a series of adjustable dampers or barriers 26 are provided, which can be positioned transversely of the length of the ducts 24 and 30 so as to subdivide it longitudinally into partially or completely isolated sections.

At spaced points along the tunnel are transverse pairs of walls 38 which terminate in parallel planes at the sides of the main tunnel 100, through which the cars with the ware stacked thereon move. As is clear from the bottom half of FIG. 1, these walls 38 provide the longitudinally spaced chambers at the sides of the main tunnel which in length are substantially equal to the length of the loaded cars.

Extending along each side of the tunnel and exteriorly thereof, are ducts 40. At this point it may be noted that the same reference numerals are used for the exterior equipment on each side of the tunnel because the apparatus is the same in each case. The ducts 40 extend for a substantial distance along each side of the cooling section of the tunnel and are provided with branches which connect with passages 42 in the walls of the housing 12. As is clear from FIG. 1, there is one of these branches for each of the chambers formed by the transverse walls 38, lying opposite the ducts 40.

On each side of the tunnel at 54, is a power driven fan, the intakes of which are respectively connected to the ducts 24 and 30 by means of the intake ducts 52. Each of these ducts have a fresh air inlet connection 56. In addition, each of the fan housings has a duct 58 which discharges to a point externally of the kiln as well as direct connections to the ducts 40. Thus the fans 54 can withdraw air from the housing ducts 24 and 30 and deliver it back into the main tunnel through the ducts 40 and their branches. The housing ducts 24 and 30 in turn draw air from the bottom of the tunnel through the ports 28, so that the same air can be recirculated while redistributing it to the main tunnel at various points therealong. At the same time the air withdrawn from the housing ducts can be tempered by incoming fresh air through the connections 56 and further modified by the discharge of portions thereof through the exhaust ducts 58. All of these ducts can be provided control valves to aid in the proportioning of the air recirculated, tempering it and discharging it from the process. The valves 41 in the branches from the ducts can adjust the quantity and velocity of the air going into the tunnel, as will be described later.

Further control of the cooling section of the kiln towards its exit end, the ware moving during the process from the left towards the right in FIG. 1, by a second set of ducts 60, likewise connected to the main tunnel at points therealong by valved branches, is illustrated. The branches of the ducts 40 where they overlap the ducts 60 can be connected to the branches of the ducts 60, so as to have common passages into the main tunnel. As in the case of the ducts 40, the ducts 60 are provided with a power driven fan 64, whose intakes connect with the housing ducts 24 and 30 through the ducts 62. These fans discharge respectively into the ducts 60, as in the previous case, and each fan is provided with fresh air inlets 66 and discharge connections 68 to points exterior of the process.

The ducts 52 and 58 and 66 and 68 are provided with valves (like the valves 41), as shown, to control the velocity and quantity of air dumped from and taken into the system. These valves together with the similar valves 41 are important in effecting the jetting action of the dampers 46 to be described now.

In accordance with this invention the cooling air supplied through the branches of each of the duct sets 40 and 60 enters the main tunnel through slotted ports 44 which are directed upwardly, as is clear particularly in FIGS. 2 and 3. In accordance with this invention and in order to get the proper controlled jetting action of this cooling air, the ports 44 are individually controlled by dampers 46 which are pivotally mounted at 48 so that they can be inclined to passages leading to the ports 44. Lying in passages in the kiln housing are control rods 50 pivotally connected at one end to the respective dampers 46 and provided with adjusting devices 52 at the other end. In the simple form illustrated, the adjusting devices comprise nuts threadedly mounted on the rods 50, which can be adjusted to vary the angular position of the dampers 46 to the point of their fully opening the ports 44, fully closing them, or throttling them in any position between these extremes.

As illustrated in FIG. 2, the various branches from the duct sets can each individually include dampers or valves 41, proportioning the amounts of cooling air moving through them individually.

The general system and its operation is disclosed in my copending application Serial No. 597,484, filed July 12, 1956, entitled Tunnel Kiln Cooling Section. For this reason the details of operation of the apparatus of this application will be omitted.

The feature of this invention is the provision of the adjustable dampers 46 in the inlet passages to the cooling air supply ports 44 by means of which the velocity of the incoming air can be adjusted. In effect this is a control of the jetting action of the air under pressure moving into the main tunnel. By controlling the velocity and/or jetting action of this cooling air, it is possible to modify the circulation of the air in the different compartments defined by the transverse walls 34 in the presence of the loaded ware cars, so that the cooling air can be caused to circulate around and through the ware to effect a precise and efficient abstraction of heat from it. The cooling air continues its circulation down to and exits from the compartments through the related exhaust ducts 28, into the main housing ducts 24 and 30. From there, as previously suggested, it goes back to the intakes of the fans and then distributed as desired through the duct sets to the different compartments along the cooling section.

In the past it has been the common practice to control only the volume of cooling air being circulated over the ware, which as is apparent from this invention, is not the most efficient way to effect heat withdrawal from the ware. As is well known in this art, different types of ware have different abilities to withstand cooling, which abilities will vary at different temperature levels in the cooling schedule. For example, a particular ware may be able to withstand a speeded up cooling rate at one point in its cooling schedule, but only a lower, or even possibly a higher cooling rate at some other point in its cooling schedule.

The system of this invention provides this flexibility. As previously indicated the various loaded cars at different positions along the tunnel 100 in relation to the isolating or barrier wall 38, provide close longitudinal space in the tunnel 100 at which the various cooling schedules in accordance with this invention can be independently and individually controlled. The control in accordance with this invention is in the rate of recirculation of the cooling air effected by varying the jetting action at the ports 44. As will be apparent to those skilled in the art, this change in jetting action is a function of the control of a series of dampers. For example, in connection with one of the blowers 54, it is possible by a related adjustment of the dampers in the connections 52, 56 and 58 and the dampers 41 in the branches from the conduits 40, to provide different rates of recirculation throughout sections along the tunnel.

From the above description it will be apparent to those skilled in the art that the subject matter of this invention is not limited to the specific structural forms herein selected for illustrative purposes, and it is desired therefore, that the structure of the drawings be taken in an illustrative sense, and the scope of protection afforded thereby be determined by the appended claims.

What is claimed is:

1. A cooling section for a tunnel kiln comprising an elongated housing through which stacks of heated ware to be cooled may be moved, means forming discharge passages terminating in orifices opening into said housing at points spaced longitudinally therealong, circulating means having an eduction connection for withdrawing gases from said housing and induction connections to said first means for supplying those gases to said first means at points spaced along said housing, means in said induction connections for adjusting the volume of gases delivered to said housing through said orifices and means for adjusting the effective size of said orifices to vary the velocity of the gases discharged into said housing whereby desired velocities of cooling gases can be produced in said housing for different volumes thereof.

2. In the combination of claim 1, means in said eduction connection for varying the volume of gases withdrawn from said housing.

3. In the combination of claim 1, means for discharging a controlled portion of the gases withdrawn from said housing to the atmosphere.

4. In the combination of claim 1, means for supplying a controlled volume of additional cooling gas to said circulating means.

5. A method of controlled cooling of stacks of heated ware moving longitudinally through an elongated cooling chamber, comprising the steps of withdrawing cooling gases from said chamber at one point and returning them to said chamber at a plurality of spaced points, adjusting the volume of gases being returned to said chamber and independently varying the velocities of the gases returned to said chamber at said spaced points.

6. In the method of claim 5, the additional step of controlling the volume of cooling gases withdrawn from said chamber.

7. In the method of claim 5, the further step of admixing additional cooling air with said withdrawn gases.

References Cited in the file of this patent

UNITED STATES PATENTS

| 1,421,155 | Booth | June 27, 1922 |
| 2,550,807 | Hanley | May 1, 1951 |

FOREIGN PATENTS

| 948,525 | France | Aug. 3, 1949 |
| 95,684 | Sweden | May 9, 1939 |